Jan. 25, 1955   J. H. HEIDORN   2,700,195
REFRIGERATOR DOOR CONSTRUCTION
Filed June 24, 1952   2 Sheets-Sheet 1
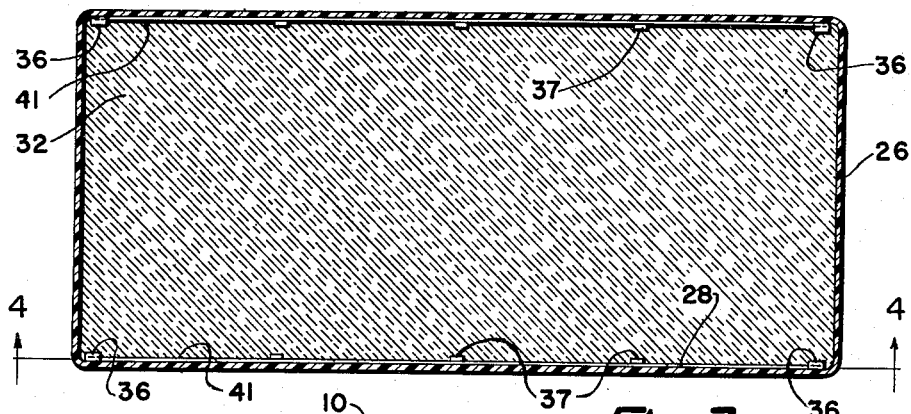
Fig. 3
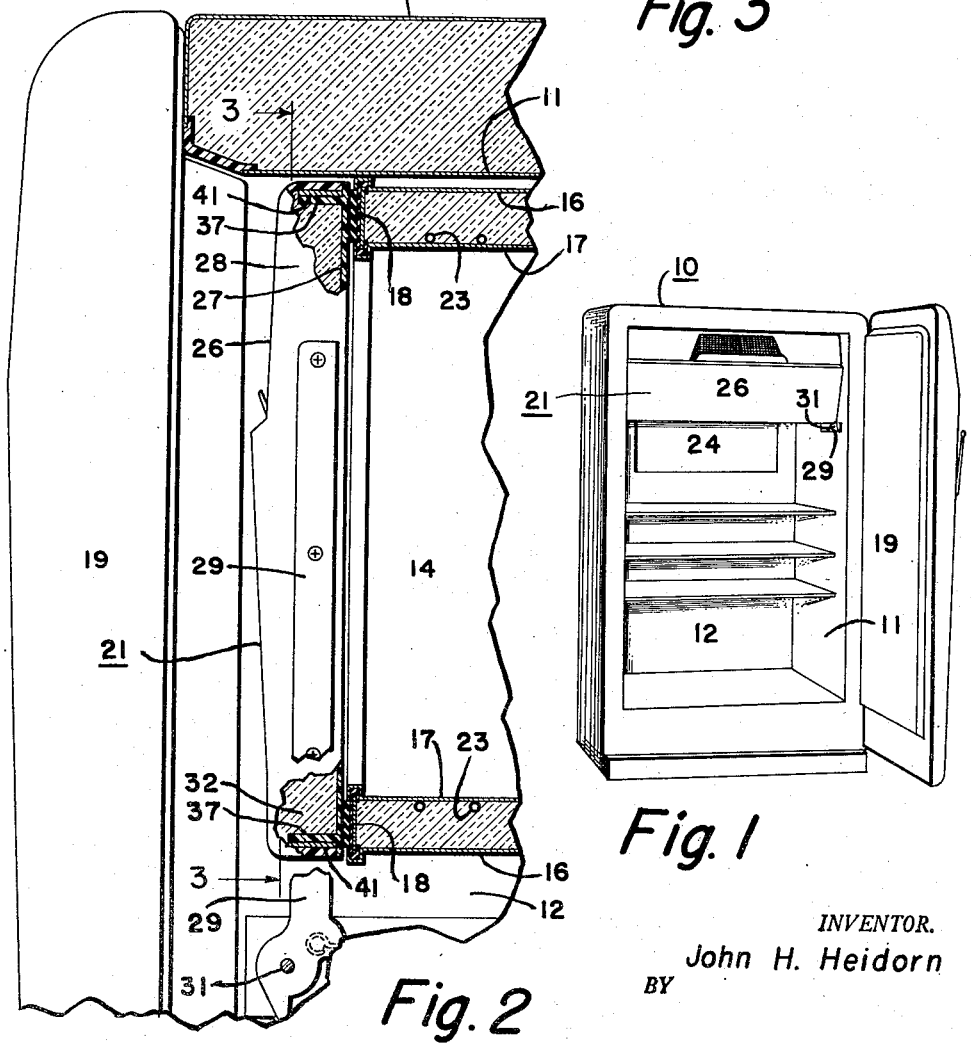
Fig. 1
Fig. 2
INVENTOR.
John H. Heidorn
BY
Willits, Hardman & Fehr
ATTYS.

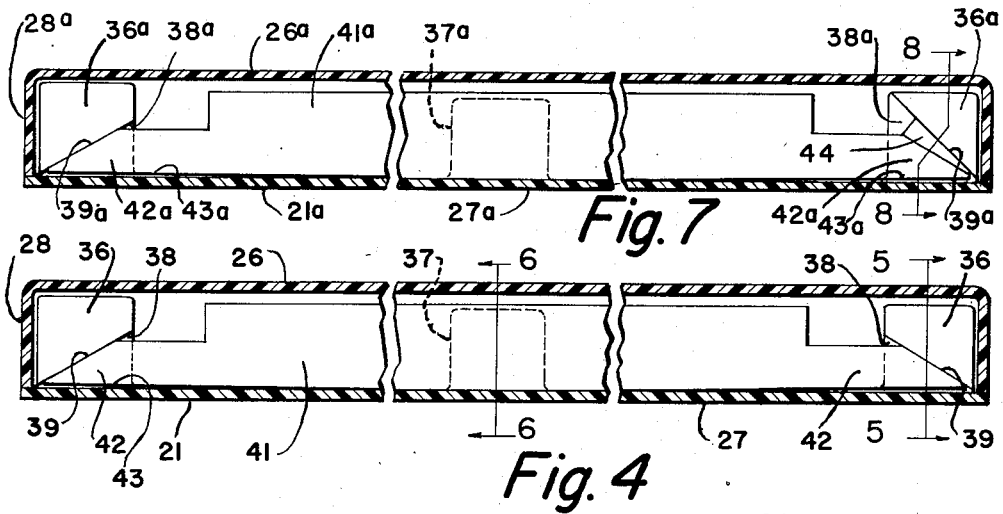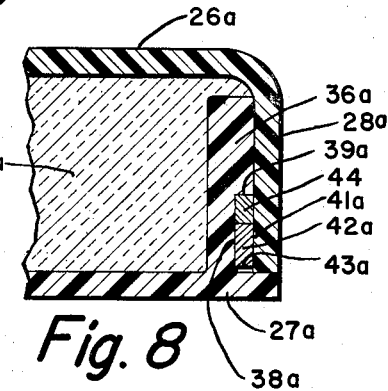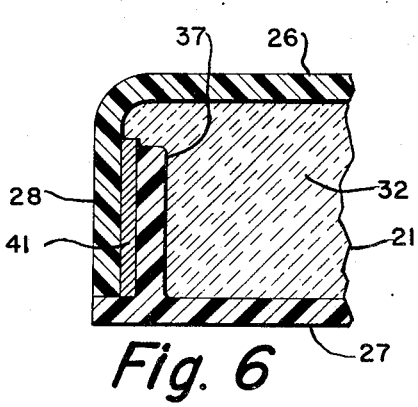

United States Patent Office 2,700,195
Patented Jan. 25, 1955

2,700,195

REFRIGERATOR DOOR CONSTRUCTION

John H. Heidorn, Dayton, Ohio, assignor to General Motors Corporation, Dayton, Ohio, a corporation of Delaware Application June 24, 1952, Serial No. 295,193

8 Claims. (Cl. 20—35)

This invention relates to closure members for freezing compartments of refrigerator cabinets.

In a refrigerator of the type wherein frozen foods as well as unfrozen foods are stored in adjacent compartments there is an appreciable temperature differential between the frozen food storage compartment and the unfrozen food storage compartment. It is now common practice to provide a freezing or frozen food storage chamber or compartment directly within the conventional food storage compartment of a household refrigerator cabinet and to provide an inner door for closing the access opening of the frozen food compartment, which is separate from and independently operable relative to an outer door employed to close the access opening of the food storage compartment containing the frozen food chamber or compartment. From both a cost and appearance standpoint, it is desirable to construct the inner door of the freezing chamber or frozen food compartment of plastic material. However, the coefficient of expansion and/or contraction of plastic materials is relatively high with respect to other portions or elements in a refrigerated cabinet and such frozen food chamber or compartment door becomes warped and results in misalignment of the door with the front of the chamber or compartment to be closed thereby. This is particularly true where the front and rear panels of an elongated door are formed of plastic material and are each exposed to zones of different temperatures relative to one another.

An object of my invention is to provide an improved door construction of low manufacturing cost which may be assembled at room temperature and thereafter subjected to low temperatures without becoming warped.

Another object of my invention is to provide an elongated door structure with molded plastic inner and outer walls or panels, each adapted to be exposed to different environments having appreciable temperature differences therebetween which structure includes means for normally applying a stress to one of its walls or panels in a direction to counteract and prevent bowing of the one wall or panel relative to the other wall or panel and separation of the panels at their juncture.

A further object of my invention is to interlockingly connect a member, of low coefficient of expansion and/or contraction as compared to molded plastic materials, to one panel of a molded thermoplastic elongated paneled door in such manner that it will normally apply a stress to the panel in a direction opposed to the direction at which the panel tends to contract and bow upon subjecting the door to low temperatures within a refrigerated compartment of a refrigerator cabinet.

In carrying out the foregoing objects it is a still further and more specific object of my invention to provide integral socket-like forming means on one molded plastic panel of a two-paneled molded plastic elongated door structure for receiving and interlocking therewith a rigid metal strap-like member which is disposed at right angles to the face of the one panel and has wedge shaped ends forced into the sockets to counteract and prevent warpage of the door structure.

Further objects and advantages of the present invention will be apparent from the following description, reference being had to the accompanying drawings, wherein a preferred form of the present invention is clearly shown.

In the drawings:

Figure 1 is a perspective view showing a refrigerator cabinet having the invention incorporated therein;

Figure 2 is an enlarged fragmentary view, with parts broken away showing a door constructed in accordance with the invention closing the access opening of a freezing compartment within the refrigerator disclosure in Figure 1;

Figure 3 is a vertical sectional view of the elongated freezing compartment door taken on the line 3—3 of Figure 2;

Figure 4 is a broken enlarged sectional view taken on the line 4—4 of Figure 3 showing a metal stress applying member interlocked with the rear panel of the freezing compartment door;

Figure 5 is an enlarged fragmentary sectional view taken on the line 5—5 of Figure 4 showing a shouldered boss on the rear door panel to which the metal member is locked;

Figure 6 is an enlarged fragmentary sectional view taken on the line 6—6 of Figure 4 showing a metal member within the door disposed between a lug on one panel and a flange on the other panel thereof;

Figure 7 is a view similar to Figure 4 and shows a modified form of my invention; and Figure 8 is a view similar to Figure 5 and is taken on the line 8—8 of Figure 7.

Referring to the drawings, for illustrating my invention, I have shown in Figure 1 thereof a refrigerator cabinet generally represented by the reference numeral 10. Cabinet 10 includes the usual outer walls and a metal liner 11 spaced therefrom and forming walls of a main food storage compartment 12 therein. Suitable insulating material (see Figure 2) is disposed in the space between the cabinet outer walls and liner 11 as is conventional in the art. An insulated box-like structure is mounted, by any suitable or desirable means, in the main storage compartment 12, to provide a freezing or frozen food storage compartment 14 within the upper portion thereof. The insulated box-like structure forming frozen food compartment 14 includes an outer shell 16, an inner liner 17, with insulating material therebetween, and a sealing member 18 at the access opening of compartment 14. The sealing member 18 is preferably provided with an outer door engaging face of soft foam rubber or the like. An outer door 19 is provided as shown for closing the open front of the refrigerator cabinet which affords access to the compartments 12 and 14. A separate horizontally elongated inner door structure, generally referred to by the reference numeral 21, is adapted to engage the sealing member 18 and serves to close the front access opening of compartment 14. The compartments 12 and 14 provide chambers or zones in which different low temperatures are maintained, and therefore the zones have an appreciable temperature differential. Food compartments or zones 12 and 14 are adapted to be refrigerated by means of a conventional refrigerating system which may include a primary evaporator or refrigerant evaporating coil 23 wrapped around and disposed in intimate thermal exchange relationship with the line 17 of the frozen food compartment 14 (see Figure 2) and a plate type or sheet metal evaporator 24 suitably mounted in the upper rear portion of the food compartment 12 (see Figure 1). The detailed construction and arrangement of the refrigerating system may be varied at will and for this reason a specific description of the elements of such a system is unnecessary. For a more complete disclosure of a refrigerating system of the type suitable for use in the refrigerator herein shown, reference is made to the copending application of Clifford H. Wurtz et al., S. N. 223,550, filed April 28, 1951, Patent Number 2,672,021, issued March 16, 1954.

The inner door or closure structure 21 comprises an elongated molded thermoplastic outer or front panel 26 and an elongated molded thermoplastic inner or rear panel 27 (see Figures 2 and 4). Door outer or front panel 26 has an integral flange 28 therearound projecting toward and engaging a mating face on the rear panel 27. This front panel 26 forms a frame which is pivotally supported by means of a pair of mounting brackets 29 journaled on stationary pins 31 carried by liner 11 of food compartment 12 as best shown in Figure 2. Any suitable or conventional means may be employed to secure the panels 26 and 27 of door 21 to one another so as to permit the flange 28 on panel 26 to form a chamber in the door between the panels in which insulating material 32, such as glass or rock wool, may be placed. The panels 26 and 27 are preferably molded from powdered styrene which is heated and forced into suitable molds. Other materials such as polyvinyl-acetate or polyvinyl-chloride may, if desired, be employed to form the door panels. Due to the high coefficient of expansion and contraction of plastic materials and the difference in temperature to which the inner and outer faces of door 21 is exposed, together with the fluctuation in temperature surrounding the inner and outer faces of the door structure 21 as the outer and inner doors 19 and 21 respectively are opened and closed, it is obvious that an appreciable amount of expansion and/or contraction of the door panels will take place from time to time. For example, when one opens the outer door 19 only, the one panel 27 or inner face of elongated door 21 is being subjected to a temperature around 5° F. in compartment 14 while the outer panel 26 or face of the door 21 may be exposed to room temperatures of 70° or more. The expansion and contraction of parts of the molded plastic door structure 21 resulting from such temperature differences renders it very difficult to prevent bowing of one panel relative to the other or warpage of the door and maintenance of a good seal with the door engaging member 18 on the insulated box structure forming frozen food compartment 14.

In accordance with my invention, I desire to construct an elongated door forming a closure between zones having an appreciable temperature differential such, for example, as the temperature within compartment 14 as compared to the temperature of compartment 12 or temperatures of the room outside the refrigerator cabinet without having the door become warped or bowed out of its original aligned assembled position. Thus I provide counteracting means in the structure of elongated door 21 which will normally apply a stress to the short sides of one of the panels thereof in a direction opposite the direction of bowing or warping of the panel when subjected to much lower temperatures than the environment temperature at the place of assembly or formation of the door. Ordinarily the rear panel 27 of a two plastic paneled door when subjected to lower temperatures than that at which the outer panel 26 is exposed will bow from end to end in a direction toward the compartment which this panel faces and may cause separation of the panels and/or warpage of the door. Referring again to the drawings, I provide the elongated rear panel 27 of door 21 with an upper set and a lower set of integral widely spaced apart bosses 36. Each boss 36 of the sets thereof is located adjacent the short side edges of panel 27 in spaced relation to the long top and bottom edge of this panel and project inwardly into the insulated chamber between the panels 26 and 27 from the inner surface of rear panel 27. The bosses 36 of each set thereof are elongated in a direction longitudinally of the door structure 21 (see Figures 3 and 4). A plurality of spaced lugs 37 are also formed integrally with panel 27 along the top and bottom edges thereof and project into the insulated chamber between the panels 26 and 27. The horizontally opposed bosses 36 of each set thereof are formed or cut away on one side thereof, as at 38, to provide a shoulder or off-set ledge 39 (see Figures 4 and 5) facing the inner surface of rear door panel 27. Each shoulder or ledge 39 forms with the inner surface of panel 27 a pocket-like portion or socket intermediate the end of bosses 36 and this panel for a purpose to be presently described. The shoulder or ledge 39 on each of the opposed bosses 36 of the two sets thereof are inclined in opposite directions relative to one another (see Figure 4). Lugs 37 are disposed inwardly a short distance of the long side edges of panel 27 to provide a space between the same and the flange 28 on door panel 26 for receiving a rigid metal strap-like member in a manner and for a purpose to be hereinafter described.

The counteracting or stress applying means in the present disclosure includes iron or steel strap-like members 41 located in the insulated chamber between the panels 26 and 27 of door 21, each of which extends continuously from one to the other of the bosses 36 of each set thereof. The metal strap members 41 are disposed at right angles to the inner surface of door panel 27 and lie between the flange 28, along the long sides of panel 26, and the lugs 37 on panel 27 (see Figures 2, 3 and 6).

Metal members 41 have reduced wedge-shaped ends 42 fitted in the sockets formed by the inclined shoulder or ledges 39 and the inner surface of rear door panel 27 (see Figures 4 and 5). That is, the one edge surface of members 41 at both ends 42 thereof are oppositely inclined to be readily insertable in the sockets. The edge of the metal members 41, opposed to the inclined edge at the ends 42 thereof, are relieved from contact with panel 27 by being formed with a radius 43 (see Figure 4) for a purpose to be presently described. It will be noted that the continuation of the edge of members 41 intermediate their radii 43, at the ends 42 thereof, is flat or straight and engages or contacts the inner surface of door panel 27. The interlocking engagement of metal members 41 with panel 27, between the inclined ledges 39 and the inner surface of panel 27, is intended to normally apply a stress to this panel in a direction tending to pull its ends toward panel 26 for preventing bowing of panel 27 upon contraction thereof and warpage of door 21. Thus door 21 remains in perfect alignment with the sealing member 18 on the box-like structure forming the freezing or frozen food compartment 14.

The structure of door 21 and the purpose of this structure having been described, I will now explain the mode of attaching the metal members 41 in interlocking engagement with panel 27. Prior to securing panels 26 and 27 together, rear panel 27 is placed on a suitable support, at room temperature, and the rigid metal strap members 41 are moved toward the long sides of this panel. The wedge-shaped ends 42 on members 41 are forced in the sockets into tight engagement with the shoulders or ledges 39 on each opposed boss 36 of each of the two sets thereof, with the edge portion of members 41 intermediate the radii 43 forced into tight engagement with the inner surface of panel 27. This forcible interlocking of member 41 to door panel 27 normally applies a stress thereto in a direction opposite the direction of natural bowing when subjected to temperatures below the temperature at which the interlocking operation is performed. The panel 27 is rather brittle and rigid but its elongated form ordinarily renders it sufficiently resilient to permit the same to be manually bowed from end to end thereof for interlocking the members 41 thereto as shown. However, if the panel 27 is formed of a plastic material which is incapable of or will not tolerate any distortion or bowing whatsoever the mode of interlocking metal members 41 to panel 27, to initially apply a stress thereto, may be varied without departing from the spirit of the invention. Thus I show in Figures 7 and 8 of the drawings, a modified arrangement for interlockingly attaching or connecting metal strap stress imparting members to such a molded plastic door panel. Reference characters identical with those employed to designate the various parts of the door in the preferred form of door structure shown in Figures 1 to 6 inclusive are used with the suffix of "a" to designate the various similar parts in the modification shown in Figures 7 and 8 of the present drawings. The essential difference between the illustration of the present invention disclosed in Figures 1 to 6 over that shown in Figures 7 and 8 is that one of the shoulders or ledges 39a on one of each set of bosses 36a is inclined upwardly away from the inner surface of rear panel 27 at a steeper angle than the angle of ledges 39. Such steeper inclination of the ledge 39a (see Figure 7) provides ample clearance between the ledge 39a and the wedge edge of member 41a which clearance is for the purpose of permitting the members 41a to be moved in place on panel 27a without necessity of bowing this panel. After the members 41a are placed in position on this panel a small wedge-shaped piece 44 may be driven into the pocket between the wedge-shaped edge of member 41a and the ledge 39a with such force as to normally apply any desired stress to panel 27a. Therefore, even though panel 27a is rigid and may not be bowed, a stress can be initially applied thereto during assembly of the door structure in a direction opposite that in which the panel 27a will bow or contract upon being exposed to very low temperatures.

By this invention it should be apparent that I have provided an improved elongated door structure having molded plastic inner and outer panels and of the type adapted to form a closure between zones having an appreciable temperature differential without warpage of the panels causing misalignment of the door. I have provided a simplified and inexpensive means for normally applying a stress to a plastic door panel which prevents its separation from another of the door panels and effectively counteracts warpage of the door when it is subjected to low temperatures or when the panels of the door are exposed to widely different temperatures. An interlocking connection of a metal member with a plastic door panel is provided by a novel arrangement and with a minimum of parts to accomplish the objects of this invention.

While the form of embodiment of the invention as herein disclosed constitutes a preferred form, it is to be understood that other forms might be adopted, as may come within the scope of the claims which follow.

What is claimed is as follows:

1. A door structure of the type adapted to form a closure between zones having an appreciable temperature differential, said structure comprising a molded plastic front panel and a molded plastic rear panel, said front panel having an integral flange therearound projecting toward and engaging a mating face on said rear panel, means securing said panels to one another to form a chamber within said door between said panels, said rear panel having an integral boss adjacent each side edge thereof projecting into said chamber from its inner surface, each boss having an off-set ledge facing said inner surface of said rear panel and forming therewith a socket, a continuous rigid metal member having its ends fitted in said sockets and having a portion thereof lying along and engaging the inner surface of said rear panel to interlockingly connect said member to said rear panel, and the interlocking connection of said rigid metal member to said rear panel normally applying a stress thereto in a direction to prevent warpage of said door while its panels are exposed to said different temperatured zones.

2. A door structure of the type adapted to form a closure between zones having an appreciable temperature differential, said structure comprising a molded plastic front panel and a molded plastic rear panel, said front panel having an integral flange therearound projecting toward and engaging a mating face on said rear panel, means securing said panels to one another to form a chamber within said door between said panels, said rear panel having an integral boss adjacent each side edge thereof projecting into said chamber from its inner surface, each boss having an off-set inclined ledge facing said inner surface of said rear panel and forming therewith a socket, the inclined ledge on one of said bosses being directed in a direction opposite the direction of inclination of the ledge on the other of said bosses, a continuous rigid metal member having wedge shaped ends, the ends of said member being fitted in said sockets, other portions of said member lying along and engaging the inner surface of said rear panel to thereby interlockingly connect said member to said rear panel, and the interlocking connection of said rigid metal member to said rear panel normally applying a stress thereto in a direction to prevent warpage of said door while its panels are exposed to said different temperatured zones.

3. A door structure of the type adapted to form a closure between zones having an appreciable temperature differential, said structure comprising a molded plastic front panel and a molded plastic rear panel, said front panel having an integral flange therearound projecting toward and engaging a mating face on said rear panel, means securing said panels to one another to form a chamber within said door between said panels, said rear panel having an integral boss adjacent each side edge thereof projecting into said chamber from its inner surface, each boss having an off-set ledge facing said inner surface of said rear panel and forming therewith a socket, a continuous rigid metal member having its ends fitted in said sockets and having a portion thereof lying along and engaging the inner surface of said rear panel to interlockingly connect said member to said rear panel, and wedge means forcibly inserted between an end of said metal member and the ledge on at least one of said bosses for normally applying a stress to said rear panel whereby warpage of said door while its panels are exposed to said different temperatured zones is prevented.

4. A door structure of the type adapted to form a closure between zones having an appreciable temperature differential, said structure comprising a molded plastic front panel and a molded plastic rear panel, said front panel having an integral flange therearound projecting toward and engaging a mating face on said rear panel, means securing said panels to one another to form a chamber within said door between said panels, said rear panel having an integral boss adjacent each side edge thereof projecting into said chamber from its inner surface, each boss having an off-set inclined ledge facing said inner surface of said rear panel and forming therewith a socket, the inclined ledge on one of said bosses being directed in a direction opposite the direction of inclination of the ledge on the other of said bosses, a continuous rigid metal member having wedge shaped ends, the ends of said member being fitted in said sockets, other portions of said member lying along and engaging the inner surface of said rear panel to thereby interlockingly connect said member to said rear panel, and a wedge element forcibly driven between an end of said metal member and the inclined ledge on at least one of said bosses for normally applying a stress to said rear panel whereby warpage of said door while its panels are exposed to said different temperatured zones is prevented.

5. A door structure of the type adapted to form a closure between zones having an appreciable temperature differential, said structure comprising an elongated molded plastic front panel and an elongated molded plastic rear panel, one of said panels having an integral flange therearound projecting toward and engaging a mating face on the other panel, means securing said panels to one another to form a chamber within said door between said panels, said other panel having an integral boss projecting into said chamber from its inner surface adjacent the short side edges thereof, each boss having an off-set ledge facing said inner surface of said other panel and forming therewith a socket, and a rigid metal member having its ends disposed in said sockets and an intermediate portion lying along and engaging the inner surface of said other panel to normally apply a stress thereto in a direction to prevent warpage of said door while its panels are exposed to said different temperatured zones.

6. A door structure of the type adapted to form a closure between zones having an appreciable temperature differential, said structure comprising an elongated molded plastic front panel and an elongated molded plastic rear panel, one of said panels having an integral flange therearound projecting toward and engaging a mating face on the other panel, means securing said panels to one another to form a chamber within said door between said panels, said other panel having a first set of integral bosses projecting into said chamber from its inner surface adjacent the short side edges thereof at the top of said door, said other panel also having a second set of integral bosses projecting into said chamber from its inner surface adjacent the short side edges thereof at the bottom of said door, the bosses of each set thereof having an off-set ledge facing said inner surface of said other panel and forming therewith a plurality of sockets, a rigid metal member associated with each of said sets of bosses, and each metal member having its ends disposed in said sockets with an intermediate portion thereof lying along and engaging the inner surface of said other panel to normally apply a stress thereto in a direction to prevent warpage of said door while its panels are exposed to said different temperatured zones.

7. A door structure of the type adapted to form a closure between zones having an appreciable temperature differential, said structure comprising an elongated molded plastic front panel and an elongated molded plastic rear panel, one of said panels having an integral flange therearound projecting toward and engaging a mating face on the other panel, means securing said panels to one another to form a chamber within said door between said panels, said other panel having a first set of integral bosses projecting into said chamber from its inner surface adjacent the short side edges thereof at the top of said door, said other panel also having a second set of integral bosses projecting into said chamber from its inner surface adjacent the short side edges thereof at the bottom of said door, the bosses of each set thereof having an offset ledge facing said inner surface of said other panel and forming therewith a plurality of sockets, a continuous rigid metal strap-like member associated with each of said sets of bosses, each metal strap-like member being disposed at right angles to the inner surface of said other panel and extending across the door between the bosses of each set thereof, and said metal strap-like members having their ends disposed in the sockets of opposed bosses of the sets thereof with an intermediate portion engaging the inner surface of said other panel to normally apply a stress to said other panel in a direction to prevent warpage of said door while its panels are exposed to said different temperatured zones.

8. A door structure of the type adapted to form a closure between zones having an appreciable temperature differential, said structure comprising an elongated molded plastic front panel and an elongated molded plastic rear panel, one of said panels having an integral flange therearound projecting toward and engaging a mating face on the other panel, means securing said panels to one another to form a chamber within said door between said panels, said other panel having an integral boss projecting into said chamber from its inner surface adjacent the short side edges thereof, each boss having an off-set ledge facing said inner surface of said other panel and forming therewith a socket, a continuous rigid metal strap-like member disposed at right angle to the inner surface of said other panel and extending across the door between said bosses, and said metal strap-like member having its ends disposed in said sockets with an intermediate portion thereof engaging the inner surface of said other panel to normally apply a stress thereto in a direction to prevent warpage of said door while its panels are exposed to said different temperatured zones.

References Cited in the file of this patent

UNITED STATES PATENTS

| | | |
|---|---|---|
| 2,332,195 | Bergstrom | Oct. 19, 1943 |
| 2,433,272 | Greiling | Dec. 23, 1947 |
| 2,506,689 | Simpson et al. | May 9, 1950 |
| 2,571,600 | Nave | Oct. 16, 1951 |